/

US012353284B2

(12) United States Patent
Fan et al.

(10) Patent No.: US 12,353,284 B2
(45) Date of Patent: Jul. 8, 2025

(54) METHOD, ELECTRONIC DEVICE, AND COMPUTER PROGRAM PRODUCT FOR DATA REBUILDING

(71) Applicant: Dell Products L.P., Round Rock, TX (US)

(72) Inventors: Huijuan Fan, Chengdu (CN); Chi Chen, Chengdu (CN); Hailan Dong, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 162 days.

(21) Appl. No.: 18/335,372

(22) Filed: Jun. 15, 2023

(65) Prior Publication Data

US 2024/0394145 A1 Nov. 28, 2024

(30) Foreign Application Priority Data

May 25, 2023 (CN) .......................... 202310601432.7

(51) Int. Cl.
*G06F 11/10* (2006.01)
(52) U.S. Cl.
CPC ................ *G06F 11/1092* (2013.01)
(58) Field of Classification Search
CPC .......... G06F 11/1092; G06F 11/1662
See application file for complete search history.

(56) References Cited

U.S. PATENT DOCUMENTS 10,146,447 B1 * 12/2018 Dong .................... G06F 3/0665
11,003,374 B2 * 5/2021 Han ....................... G06F 3/061

OTHER PUBLICATIONS

Dell Technologies, "Dell Unity: Dynamic Pools," Technical White Paper H16289, Apr. 2022, 43 pages.
dell.com, "Dell Unity: Understanding Dynamic Pools (Mapped RAID)," https://www.dell.com/support/kbdoc/en-us/article/lkbprint?ArticleNumber=000014913&AccessLevel=10&Lang=en, Article No. 000014913, May 2, 2023, 9 pages.

* cited by examiner

*Primary Examiner* — Bryce P Bonzo
*Assistant Examiner* — Audrey Emma Whitesell
(74) *Attorney, Agent, or Firm* — Ryan, Mason & Lewis, LLP

(57) ABSTRACT

A method includes: determining, in response to a failure of a disk where a RAID extent (RE) in a storage system is located, a first disk set based on a predetermined range and the failed disk, wherein the first disk set comprises a plurality of disks within the predetermined range that are associated with the RE; determining a second disk set for rebuilding data located on the failed disk based on other disks in the first disk set than the plurality of disks that are associated with the RE; determining scores for disks in the second disk set based on disk correlations, RE spans, and weights of the plurality of disks in the second disk set; determining a target disk among the plurality of disks in the second disk set based on the plurality of scores; and rebuilding the data located on the failed disk on the target disk.

20 Claims, 9 Drawing Sheets

METHOD, ELECTRONIC DEVICE, AND COMPUTER PROGRAM PRODUCT FOR DATA REBUILDING

RELATED APPLICATION

The present application claims priority to Chinese Patent Application No. 202310601432.7, filed May 25, 2023, and entitled "Method, Electronic Device, and Computer Program Product for Data Rebuilding," which is incorporated by reference herein in its entirety.

FIELD

Embodiments of the present disclosure relate to the field of computers, and more particularly, to a method, an electronic device, and a computer program product for data rebuilding.

BACKGROUND

With the development of data storage technologies, various data storage systems have been able to provide users with increasingly higher data storage capacities. While data storage capabilities are improved, users also have increasingly high demands for data reliability and extendibility of storage systems. At present, many data storage systems based on redundant array of independent disks (RAID) have been developed to improve the reliability of data. When one or more disks in the storage system fail, the data in the failed disk can be rebuilt from data on other disks that are operating normally.

SUMMARY

Embodiments of the present disclosure provide a method, an electronic device, and a computer program product for data rebuilding.

According to a first aspect of the present disclosure, a method for data rebuilding is provided. The method includes: determining, in response to a failure of a disk where a RAID extent of a RAID in a storage system is located, a first disk set based on a predetermined range and the failed disk, wherein the first disk set comprises a plurality of disks within the predetermined range that are associated with the RAID extent. The method further includes: determining a second disk set for rebuilding data located on the failed disk based on other disks in the first disk set than the plurality of disks that are associated with the RAID extent. The method further includes: determining a plurality of scores for a plurality of disks in the second disk set based on a plurality of disk correlations, a plurality of RAID extent spans, and a plurality of weights of the plurality of disks in the second disk set. The method further includes: determining a target disk among the plurality of disks in the second disk set based on the plurality of scores. The method further includes: rebuilding the data located on the failed disk on the target disk.

According to a second aspect of the present disclosure, an electronic device is further provided. The electronic device includes a processor and a memory coupled to the processor, wherein the memory has instructions stored therein, and the instructions, when executed by the processor, cause the electronic device to execute actions. The actions include: determining, in response to a failure of a disk where a RAID extent of a RAID in a storage system is located, a first disk set based on a predetermined range and the failed disk, wherein the first disk set comprises a plurality of disks within the predetermined range that are associated with the RAID extent. The actions further include: determining a second disk set for rebuilding data located on the failed disk based on other disks in the first disk set than the plurality of disks that are associated with the RAID extent. The actions further include: determining a plurality of scores for a plurality of disks in the second disk set based on a plurality of disk correlations, a plurality of RAID extent spans, and a plurality of weights of the plurality of disks in the second disk set. The actions further include: determining a target disk among the plurality of disks in the second disk set based on the plurality of scores. The actions further include: rebuilding the data located on the failed disk on the target disk.

According to a third aspect of the present disclosure, a computer program product is provided. The computer program product is tangibly stored on a non-transitory computer-readable medium and includes computer-executable instructions, wherein the computer-executable instructions, when executed by a device, cause the device to perform the method according to the first aspect.

This Summary is provided to introduce the selection of concepts in a simplified form, which will be further described in the Detailed Description below. The Summary is neither intended to identify key features or principal features of the claimed subject matter, nor intended to limit the scope of the claimed subject matter.

BRIEF DESCRIPTION OF THE DRAWINGS

The above and other features, advantages, and aspects of embodiments of the present disclosure will become more apparent in conjunction with the accompanying drawings and with reference to the following Detailed Description. In the accompanying drawings, identical or similar reference numerals represent identical or similar elements, in which.

DETAILED DESCRIPTION

Figure 1:
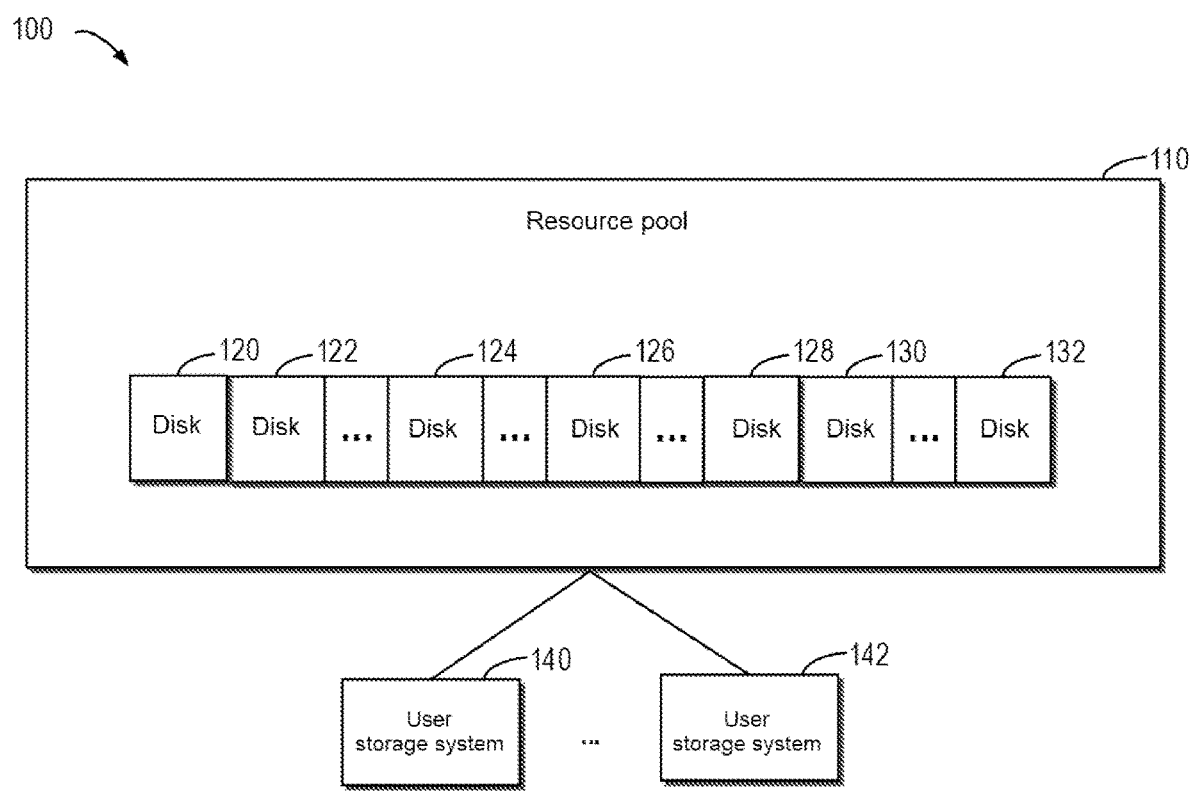
FIG. 1 is a schematic diagram of an example environment in which embodiments of the present disclosure can be implemented.

Illustrative embodiments of the present disclosure will be described in more detail below with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below. In addition, all specific numerical values herein are examples, which are provided only to aid in understanding, and are not intended to limit the scope.

In conventional technologies, the mapped RAID has been developed. In this mapped RAID, disk is a logical concept and may include a plurality of disk extents (DEs). A plurality of extents included in one logical disk may be distributed on different physical disks in the storage system. For a plurality of extents in one stripe of a mapped RAID, the plurality of extents should be distributed across different physical storage devices, so that when a physical disk on which one of the plurality of extents is located fails, a rebuilding operation can be performed to recover data from the physical disks on which the other extents are located.

In conventional technologies, a RAID-based storage system can combine a plurality of disks into a disk array. By providing redundant disks, the reliability of the whole disk group can greatly exceed that of a single disk. The RAID may provide various advantages over a single disk, for example, enhanced data integration, enhanced fault tolerance functions, increased throughput or capacity, and so on. There are multiple standards for RAID, such as RAID-1, RAID-2, RAID-3, RAID-4, RAID-5, RAID-6, RAID-10, RAID-50, and so on.

In the research, it is found that in order to facilitate the management of a plurality of disks in a storage system, it has been proposed to divide the plurality of disks into at least one group according to grouping thresholds (including an upper limit threshold and a lower limit threshold). For example, in a drive partnership group (DPG), stripes in a user storage system can be created based on the disks in each group. Due to the limitation of the number of disks in a group, in some cases, it is not possible to divide all disks in a storage system into corresponding groups. Further, there may be a situation where the usage loads of the disks in various groups are seriously unbalanced.

It will be understood that the number of disks included in a group has a threshold range (e.g., including an upper limit threshold and a lower limit threshold). In general, the upper limit threshold may be set to 64 or some other values, and the lower limit threshold may be determined based on the stripe width of the storage system and the number of backup disks required. For example, in a 4D+1P storage system with the stripe width of 4+1=5 and the number of backup disks of 1, the lower limit threshold can be determined based on the sum of the two: 5+1=6. At this moment, each group may include 6 to 64 disks. When the number of disks included in a resource pool exceeds 64, there may exist a plurality of groups.

The threshold range may impose many limitations on the management of a storage system. For example, when expanding the number of storage systems in a resource pool, there may be a situation where newly added storage systems cannot be divided into a certain group. For another example, there may be a significant imbalance in the usage loads of the disks in each group, which will cause a significant imbalance in the available storage space and lifetime of the disks in the storage system, and so on.

In some cases, DPGs within a dynamic pool are used to limit the number of drives that other dynamic pool objects can span. This level of fencing can prevent data from being distributed across a large number of drives, which increases the risk of running into situations where a plurality of drives fail. This may reduce or destroy incremental rebuilding for PACO (proactive copy) failures selected by RAID protection (when PACO fails due to drive failures during PACO, the rebuilding can complete the remaining PACO portion instead of the entire drive contents).

For example, in some products, the number of disks of the DPG is fixed at 64, while in others it is fixed at 25. For simplicity, DPG=64 is used as an example herein, but the example is not restrictive. In this way, it is necessary to keep disk (n) to have no more than 64 failure domains. This fixed fencing mechanism will have three limitations.

In the first limitation, if the resource pool has 64+6 disks, there can be 64 disks in one DPG, and if one disk fails, there are up to 63 disks ready for use in rebuilding. But for the second DPG with only 6 disks, if one disk fails, there are only 5 disks ready for use in rebuilding. This means that the rebuilding efficiency is not balanced across DPGs. Similarly, the load distribution across the 64 disks and the 6 disks is also unbalanced.

In the second limitation, at the DPG boundary, any expansion smaller than the RAID width plus one disk is not supported. The following Equation (1) indicates the number of valid disks that can be selected for each disk type:

$$64 \times N + W + 1 <= \text{the total number of disks} <= 64 \times N + 64 \quad (1)$$

where N>=0, N is an integer, and N denotes the number of disks; and W denotes the width of RAID.

In the third limitation, expansion is complex and time-consuming, especially in the case of expansion across DPGs. This limitation may lead to poor customer experience and inefficient RAID performance.

In view of this, the method of the present disclosure provides a solution for data rebuilding. This solution provides a dynamic fencing mechanism based on dynamic disk boundary. This dynamic fencing mechanism introduces a "predetermined window (also called a dynamic disk boundary window)" and a "RAID extent span" for each disk to denote the RE span of the correlated disk. This solution also provides an optimized disk rebuilding algorithm. In this way, this dynamic fencing mechanism not only supports the use of any number of disks in the mapped RAID, but also improves the efficiency of data rebuilding by widening the rebuilding write domain.

FIG. 1 illustrates a schematic diagram of an example environment 100 in which embodiments of the present disclosure can be implemented. The environment 100 may be referred to as a storage system 100. As shown in FIG. 1, the storage system 100 may include a resource pool 110, and the resource pool 110 may include a plurality of disks, for example, disk 120, disk 122, . . . , disk 124, . . . disk 126, . . . , disk 128, disk 130 . . . and disk 132. One storage device may include one or more disks. However, for simplicity purposes herein, the disk and the storage device are sometimes used interchangeably.

The storage system 100 may be a RAID-based storage system. The storage system 100 may include a plurality of RAID extents (REs). One RE can be created across a plurality of disks according to predetermined rules. One RE may include one or more stripes. However, for simplicity purposes herein, the stripe may also be referred to as RE. Therefore, the stripe and the RE can be used interchangeably herein.

Generally, one stripe may include a plurality of DEs. The DE is the smallest disk resource unit in the mapped RAID. The capacity of the disk will be organized into a set of continuous non-overlapping ranges. All DEs on the same type of storage devices should have the same fixed size. Included in a DE, most of the space is used as user data space and a small portion is used as internal metadata space.

As an example, a stripe may be composed of N DEs. N denotes the width of a RAID group according to a RAID configuration policy (for example, a 4+1 RE contains 5 DEs). The mapped RAID group created on the resource pool applies a number of RAID algorithms to protect data integrity. A mapped RAID group is a set of RAID ranges. Disks in one mapped RAID group are in the same performance layer. More specifically, they should be of the same type, such as Near Line Serial Attached SCSI (NL-SAS), Serial Attached SCSI (SAS), and flash memory. In addition, in the storage system 100, user storage systems 140, . . . , and 142 can be created respectively based on the various disks in the resource pool 110.

Figure 2:
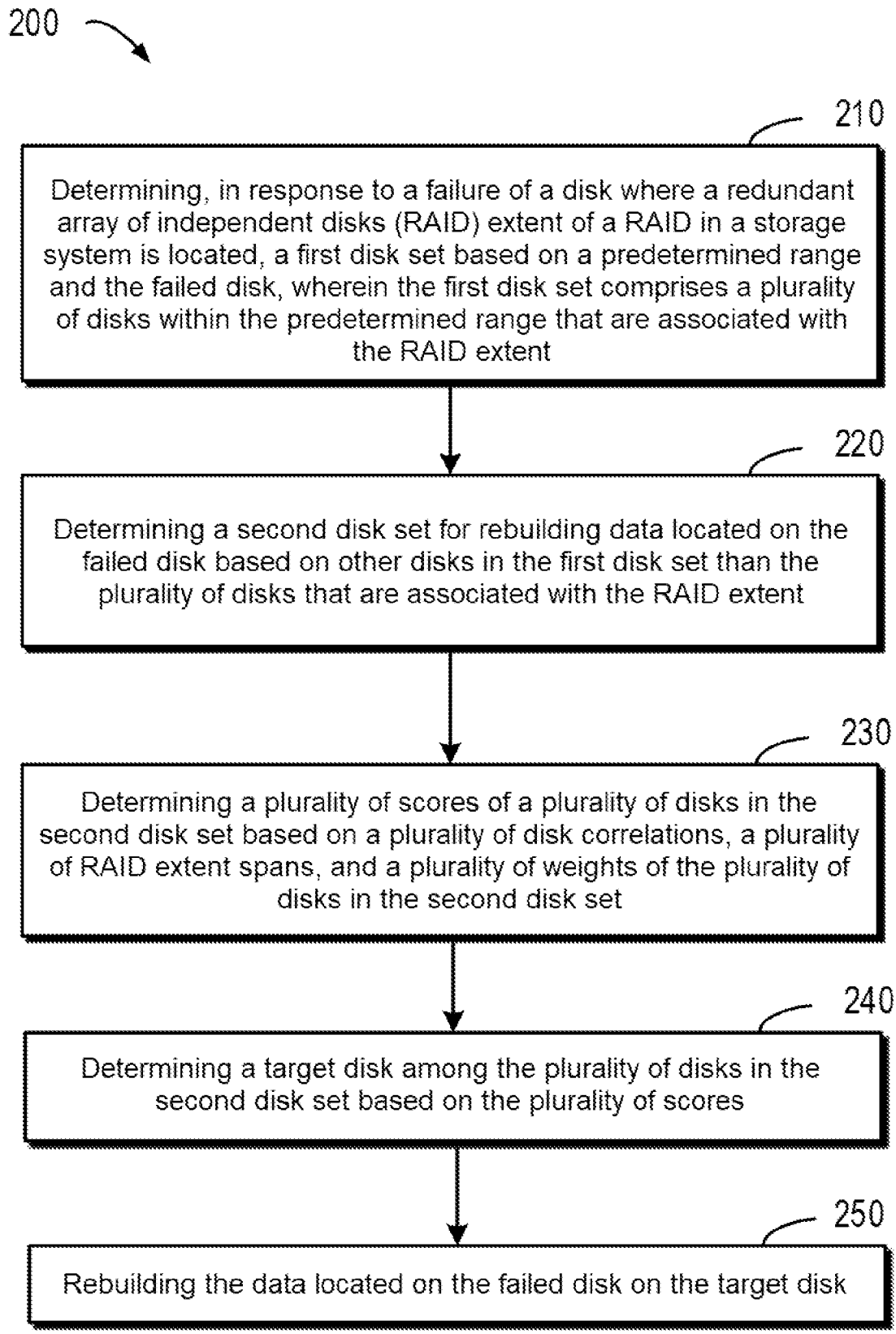
FIG. 2 is a flow chart of a method for data rebuilding according to an illustrative embodiment of the present disclosure.

FIG. 2 is a flow chart of a method 200 for data rebuilding according to an illustrative embodiment of the present disclosure. The method 200 will be described below with reference to FIGS. 1 to 6. At block 210: determining, in response to a failure of a disk where a RAID extent of a RAID in a storage system is located, a first disk set based on a predetermined range and the failed disk, wherein the first disk set comprises a plurality of disks within the predetermined range that are associated with the RAID extent.

As an example, it is assumed that one RE involves the disk 122, the disk 124, the disk 126, the disk 128, and the disk 130, wherein the disk 126 fails. At this time, it is necessary to rebuild the data located on the disk 126 to other disks. Then, a predetermined range and the failed disk 126 can be used to determine a first disk set. The concepts related to the predetermined range are described below in conjunction with FIG. 3.

Figure 3:
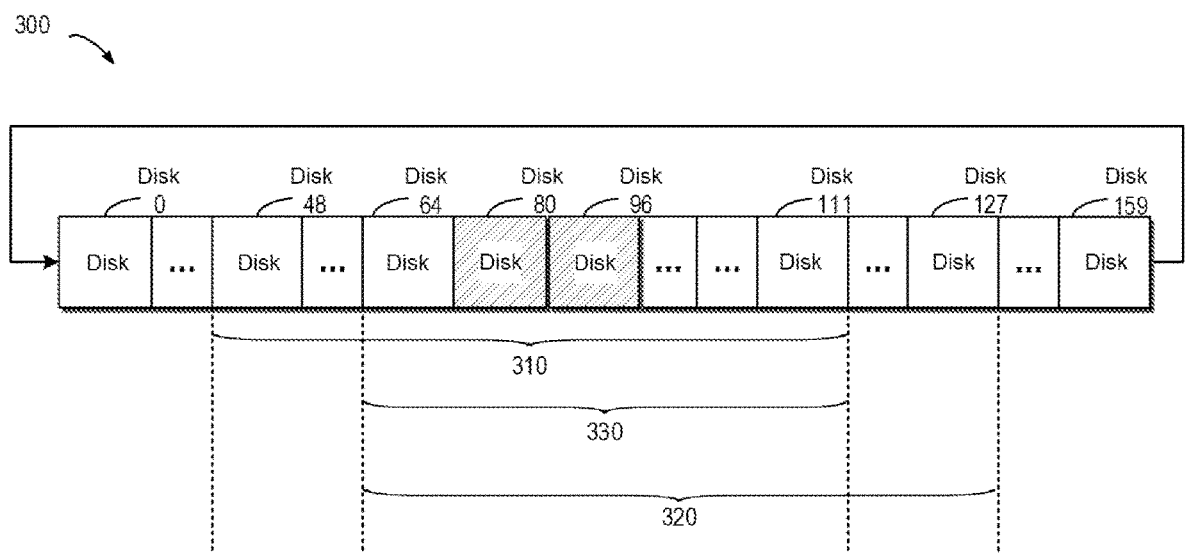
FIG. 3 is a schematic diagram of a dynamic disk boundary window according to an illustrative embodiment of the present disclosure.

FIG. 3 is a schematic diagram 300 of a dynamic disk boundary window according to an illustrative embodiment of the present disclosure. In order to ensure the rebuilding performance when any disk in the pool fails, a new term "dynamic disk boundary window" is introduced herein. The dynamic disk boundary window is intended to provide a dynamic 64 disk fence boundary for each disk, rather than a physically fixed DPG boundary, where "64" is to ensure the rebuilding performance when any disk in the resource pool fails.

As shown in FIG. 3, a write domain that can be used to rebuild data can be selected based on the dynamic disk boundary windows (e.g., a dynamic disk boundary window 310 and a dynamic disk boundary window 320). According to an illustrative embodiment of the present disclosure, the concept of "grouping" in the existing technical solutions is abandoned, and a plurality of disks within the dynamic disk boundary window can be determined from the resource pool as the write domain.

Hereinafter, only a 4D+1P storage system will be described as an example. The dynamic disk boundary window 310 and the dynamic disk boundary window 320 may have predetermined widths. The write domains used for rebuilding data can be determined based on other disks in the dynamic disk boundary window than the target disk.

Herein, for any disk i, the 64 disk boundary therefor can be {Disk ((i+N−32) mod N), . . . , Disk i, . . . , Disk ((i+31) mod N)}. All disks in the resource pool can be considered as a continuous circle, with each disk having neighbors. For example, Disk 0 and Disk 159 can be considered to be connected end to end, and therefore neighbors to each other. Disk 0 and Disk N−1 are neighbors. Thus, as long as N>64, each disk can have its own 32 left neighbors and 31 right neighbors.

As shown in FIG. 3, the dynamic pool consists of 160 disks {Disk 0, . . . , Disk 159}. Consider Disk 80, its "dynamic disk boundary window" is {Disk 48, . . . , Disk 111}. For Disk 96, its "dynamic disk boundary window" is {Disk 64, . . . , Disk 127}.

It is easy to understand that if Disk 80 is correlated to Disk 96, their related REs/DEs must lie in the intersection 330 {Disk 64, . . . , Disk 111}. For the edge Disk 0, its "dynamic disk boundary window" is {Disk 128, . . . , Disk 31}.

In the dynamic fence mapping RAID framework disclosed herein, the concept of the failure domain has also changed because there is no fixed DPG. Each disk has its own failure domain. If one disk fails, other disks in this failure domain will participate in the rebuilding, and if another disk in the failure domain fails, a double-disk failure will occur.

According to the "dynamic disk boundary window" rule defined for each disk in the dynamic fencing mechanism, the grouping in an existing storage system is abandoned, and thus the appropriate disks in the storage system can be managed in a more flexible way. In addition, the rules of RAID extents can be obtained: for any RE, the serial number {DiskSN}_(right-most) of the rightmost disk and the serial number {DiskSN}_(left-most) of the leftmost (leftmost and rightmost should be understood as: leftmost and rightmost in the clockwise direction in the case where the storage pool is considered as a circle) disk satisfy the condition that the difference between the two ({DiskSN}_(right-most)-{DiskSN}_(left-most)+1) is not greater than 33. This reason will be illustrated below with reference to FIG. 4.

Figure 4:
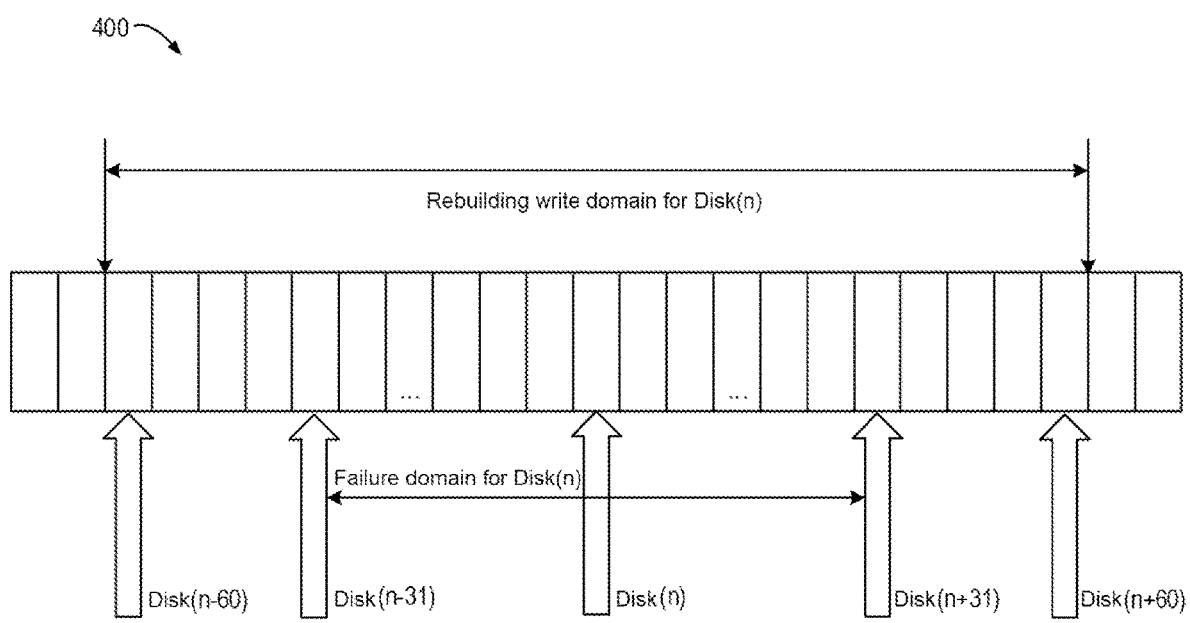
FIG. 4 is a schematic diagram of a failure domain and a rebuilding write domain according to an illustrative embodiment of the present disclosure.

FIG. 4 is a schematic diagram 400 of a failure domain and a rebuilding write domain according to an illustrative embodiment of the present disclosure. As shown in FIG. 4, when the size of the dynamic disk boundary window is 64, it is necessary to keep the failure domain of disk (n) below 64. When disk (n) is the leftmost disk of the RE, {DiskSN}_(left-most)=n, and since it is necessary to keep the failure domain for disk (n) within {disk (n−32), . . . , disk (n+31)}, the possible rightmost disk of the RE may be disk (n+31), {DiskSN}_(right-most)=n+31. Thus, {DiskSN}_(right-most)-{DiskSN}_(left-most)+1=32.

Similarly, when disk (n) is the rightmost disk of the RE, {DiskSN}_(right-most)=n, and it is necessary to keep the failure domain of disk (n) within {disk (n−32) . . . , disk (n+31)}, so the possible leftmost disk of the RE is disk (n−32), {DiskSN}_(left-most)=n−32. Thus, {DiskSN}_(right-most)-{DiskSN}_(left-most)+1=33.

Therefore, it can be concluded that if the storage system always keeps ({DiskSN}_(right-most)-{DiskSN}_(left-most)+1)<=32, the 64 disk failure domain can be guaranteed. That is, any RE that satisfies ({DiskSN}_(right-most)-{DiskSN}_(left-most)+1)<=32 will not violate the availability of protection provided by the 64 disk failure domain.

Returning to FIG. 2, having understood the dynamic disk boundary window (also referred to as the predetermined range), for disks in that RE other than the failed disk 126, such as the disk 122, a dynamic disk boundary window can be determined for the disk 122. Similarly, the respective dynamic disk boundary windows for the disk 126, the disk 128, and the disk 130 can be determined. By computing the intersection of these four dynamic disk boundary windows, the dynamic disk boundary window intersection (also referred to as the first disk set) can be obtained.

At block 220: determining a second disk set for rebuilding data located on the failed disk based on other disks in the first disk set than the plurality of disks that are associated with the RAID extent. As an example, the disk 122, the disk 124, the disk 126, the disk 128, and the disk 130 can be removed from the dynamic disk boundary window intersection. The remaining disks in the dynamic disk boundary window intersection are determined as a selectable disk set (also referred to as a second disk set) for the failed disk 126.

At block 230: determining a plurality of scores for a plurality of disks in the second disk set based on a plurality of disk correlations, a plurality of RAID extent spans, and a plurality of weights of the plurality of disks in the second disk set. As an example, it is assumed that a plurality of disks in the selectable disk set include the disk 120 and the disk 132. Then, the score C can be determined respectively for the disk 120 and the disk 132. The following will provide a description in conjunction with FIGS. 5 and 6 of how to determine the scores.

Figure 5:
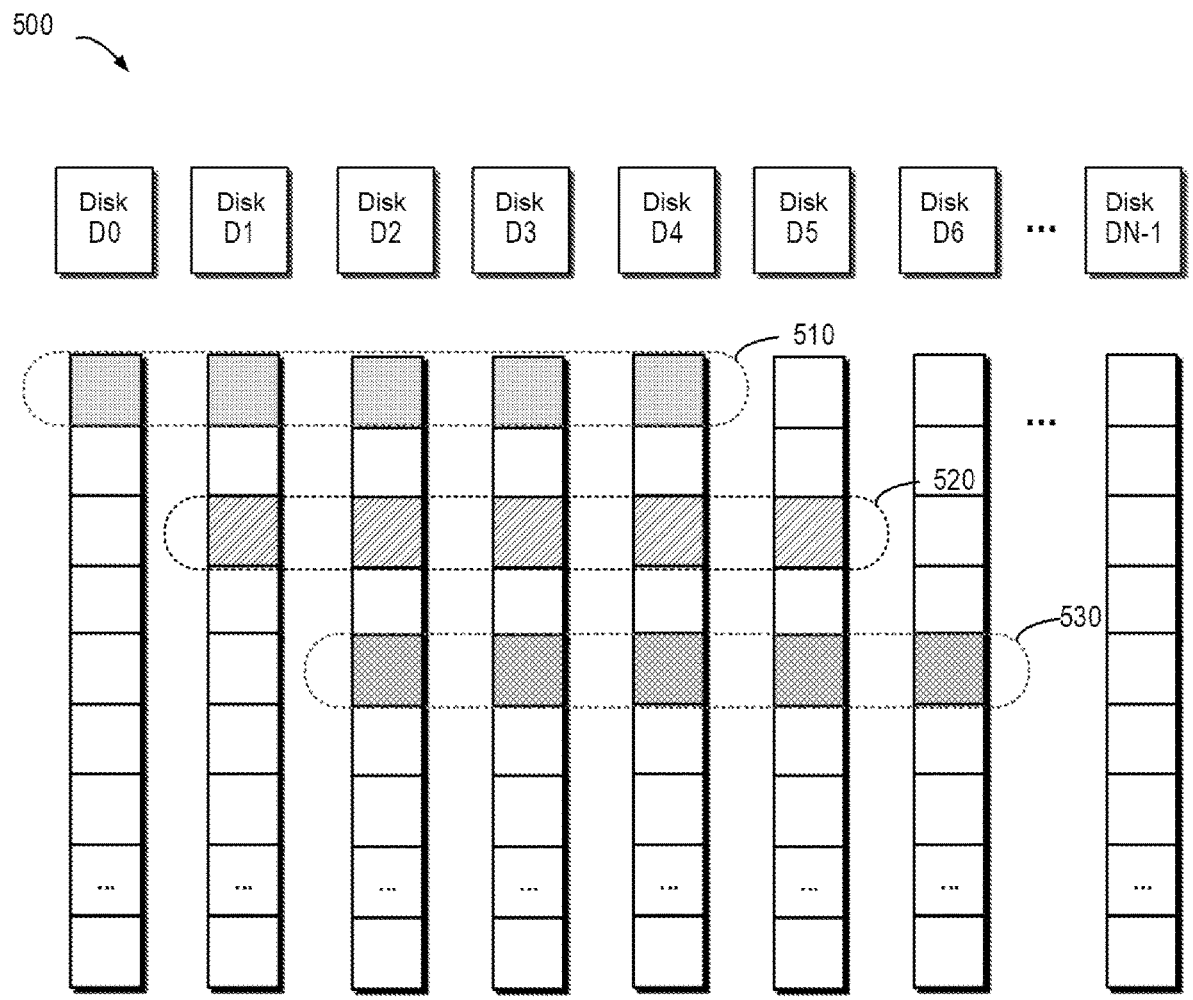
FIG. 5 is a block diagram of a process for determining the correlation between two disks according to an illustrative embodiment of the present disclosure.

First, the concept of correlation between two disks is introduced. FIG. 5 is a block diagram of a process 500 for determining the correlation between two disks according to an illustrative embodiment of the present disclosure. Take a 4D+1P RAID stripe as an example, it includes 5 disk extents (DEs), and the data in the 5 DEs are usually accessed in association. This results in an increase in the number of accesses to 5 disks including the 5 DEs, respectively. Generally speaking, for any two disks, the more stripes the two disks serve together, the greater the possibility that the two disks will be accessed at the same time, and the higher the workloads of the two disks. Therefore, the simultaneous servicing of too many stripes by two disks should be avoided as much as possible.

For the ith disk and the jth disk (i≠j) among multiple disks, the correlation between the two disks can be expressed as $\gamma_{Disk\ i, Disk\ j}$. According to an illustrative embodiment of the present disclosure, the correlation of a disk with respect to itself may be set to 0, that is, $\gamma_{Disk\ i, Disk\ i}=0$. With the use of the storage system, some stripes will be created in the storage system, and in the following, reference will be made to FIG. 5 to describe how to determine the correlation between disks.

It is assumed that the storage system includes N (N is a positive integer) disks D0 to DN−1. Three stripes 510, 520, and 530 have been created in the storage system, and the correlation $\gamma_{Disk\ i, Disk\ j}$ can be determined based on the number of stripes that jointly involve the ith disk and the jth disk. If it is desired to determine the correlation between the disk D0 and the disk D1 (i.e., i=0, j=1), it can be found that only the stripe 510 uses extents in the disk D0 and the disk D1 at the same time, and thus $\gamma_{Disk\ 0, Disk\ 1}=1$.

For another example, if it is desired to determine the correlation between the disk D1 and the disk D2 (i.e., i=1, j=2), it can be found that the stripe 510 uses extents in the disk D1 and the disk D2 at the same time, and the stripe 520 also uses extents in the disk D1 and the disk D2 at the same time, and thus $\gamma_{Disk\ 1, Disk\ 2}=2$. Similarly, the correlation between any two disks in a plurality of disks can be determined. A mapping relationship between stripes and extents in the stripes may be conveniently obtained from the address mapping of the storage system. Thus, in illustrative embodiments of the present disclosure, the correlation $\gamma_{Disk\ 1, Disk\ 2}$ between any two disks can be determined in a simple and effective manner.

According to an illustrative embodiment of the present disclosure, the disk correlation of a specific disk among a plurality of disks may be determined based on the correlation between two disks. Specifically, the correlation between this specific disk and each of the disks other than the specific disk can be determined respectively. Further, the disk correlation of the specific disk can be determined based on the determined correlation.

According to an illustrative embodiment of the present disclosure, the disk correlation can be set to be directly proportional to the correlation between the disk and each of the other disks. For example, the sum of a plurality of correlations can be acquired, and the disk correlation can be determined based on a summation operation. In such an embodiment of the present disclosure, based on a simple mathematical operation, the disk correlation of that specific disk can be determined based on the correlations between the specific disk and other disks. Assuming that it is desired to determine the disk correlation of the ith disk, the correlation between the ith disk and other jth disk (0≤j≤N−1, and i≠j) can be determined based on the method described above with reference to FIG. 5. According to an illustrative embodiment of the present disclosure, the disk correlation $\gamma_{Disk\ i}$ of the ith disk can be determined based on the following Equation (2):

$$\gamma_{Disk\ i} = \sum_{j=0}^{N-1} \gamma_{Disk\ i, Disk\ j} \qquad (2)$$

where $\gamma_{Disk\ i}$, denotes the disk correlation of the ith disk, $\gamma_{Disk\ i, Disk\ j}$ denotes the correlation between the ith disk and the jth disk, and N denotes the number of disks in the resource pool.

In some embodiments of the present disclosure, for the ith disk, the disk correlation Y Disk i of the device denotes the total sum of correlations between the ith disk and the other N−1 disks. At this time, the disk correlation can accurately measure the degree of correlation between the ith disk and the other disks, and can reflect the workload of this disk. By selecting, based on disk correlations, the disks used to create stripes, it is possible to accurately select, based on the workload of each disk, appropriate disks that will help to achieve load balancing.

It will be understood that the above Equation (2) is only a specific example for determining the disk correlation. According to an illustrative embodiment of the present disclosure, other formulas may also be used to determine the disk correlation. For example, the disk correlation can be determined based on the product of a plurality of correlations. It has been described above as to how to determine the disk correlation $\gamma_{Disk\ i}$ for the ith disk, and after determining the disk correlation $\gamma_{Disk\ i}$, the disk correlation can be determined for the RE (e.g., RE e), which is obtained from Equation (3):

$$\gamma_{REe} = \sum_{Disk\ j \in RE\ e} \gamma_{Disk\ j} \quad (3)$$

wherein $\gamma_{RE\ e}$ denotes the disk correlation of RE e, which means the sum of the correlations of a plurality of disks where DEs constituting the RE e are located.

Now returning to FIG. 2, in order to evaluate the distribution state of disks, a score C is introduced herein, which combines the disk correlation and the RE span. With regard to the RE span, it will be described below in conjunction with FIG. 6. It is worth noting that the lower the disk correlation and the larger the RE span, by which a better C can be achieved, then the better the disk distribution system will be. The score C can be calculated by the following Equation (4):

$$C = \omega_\gamma \cdot \gamma + \omega_S \cdot \frac{1}{s} \quad (4)$$

where $\gamma$ denotes the correlation, and S denotes the RE span; and $\omega_\gamma$ denotes the weight of the correlation, $\omega_S$ denotes the weight of the RE span, and $\omega_\gamma + \omega_S = 1$. By adjusting the weights, a better overall balance result can be obtained. The newly introduced RE span will be described below in conjunction with FIG. 6.

Figure 6:
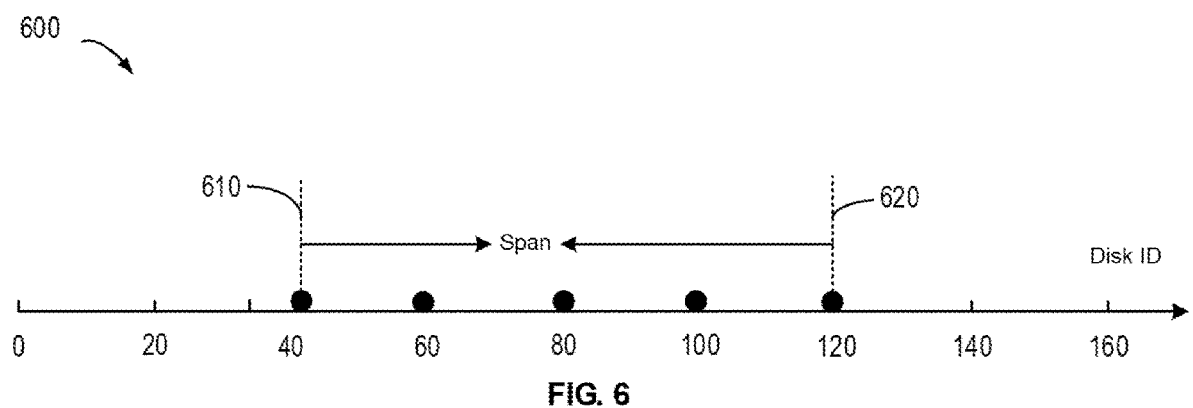
FIG. 6 is a schematic diagram of a RAID extent (RE) span according to an illustrative embodiment of the present disclosure.

FIG. 6 is a schematic diagram of an RE span 600 according to an illustrative embodiment of the present disclosure. For ease of understanding, a new term "RAID block span" (which for simplicity can be referred to as RE span) is introduced here to denote the span of the correlated disks in the RE. It can be calculated as the count of disks between the leftmost RE/DE correlated disk and the rightmost RE/DE correlated disk. The larger the RE span, the wider the rebuilding write domain, and the higher the system rebuilding efficiency.

As shown in FIG. 6, for this RE, the disk ID of the left boundary is 40, and the disk ID of the right boundary is 120. The RE span of this RE is the region between the dotted line 610 and the dotted line 620. In the illustrated case, the RE span S=120-40-80.

As a more general example, it is assumed that there are a total of N disks in the dynamic pool. For one RE, it consists of 5 DEs {DE0,DE1,DE2,DE3,DE4} that reside on 5 disks, respectively. First, the leftmost RE/DE correlated disk and the rightmost RE/DE correlated disk among the 5 correlated disks can be obtained. Then, its RE span can be calculated by the following Equation (5):

$$S = \{DiskSN\}\_(right-most) - \{DiskSN\}\_(left-most) + 1 \quad (5)$$

where {DiskSN}_n denotes the serial number of disk (n).

For example, in a dynamic pool having 160 disks, if the given RE correlated disks are {disk 50, disk 60, disk 61, disk 62, disk 70}, it has an RE span S=70-50+1=21. If the DE on disk 50 is relocated to disk 90, its RE correlated disks are {disk 60, disk 61, disk 62, disk 70, disk 90}, and its RE span becomes S=90-60+1=31.

Having understood the RE span, two extreme scenarios of RE rebuilding write domains can be considered:

For RE {Disk(n−32), Disk(n−31), Disk(n−30), Disk(n−29), Disk(n)}, when DE(n) fails and needs to be replaced, it is required to follow ({DiskSN}_(right-most)-{DiskSN}_(left-most)+1)<=32. So, a new RE: {DE(n−61), DE(n−32), DE(n−31), DE(n−30), DE(n−29)} can be formed by selecting DE(n−61) as the leftmost disk to expand the rebuilding write domain to replace DE(n). This does not violate the RAID protection availability calculation.

Similarly, for RE {Disk(n), Disk(n+28), Disk(n+29), Disk(n+30), Disk(n+31)}, when DE(n) fails and needs to be replaced, a new RE: {DE(n+28), DE(n+29), DE(n+30), DE(n+31), DE(n+60)} can be formed by selecting DE(n+60) as the rightmost disk to expand the rebuilding write domain to replace DE(n).

So, the rebuilding write domain of disk (n) can be expanded to {Disk(n−61), . . . . Disk(n+60)}, and there are 61+61−1=121 disks, while it is 64−1=63 disks in the conventional rebuilding write domain approach. Therefore, this new rebuilding method greatly improves the rebuilding efficiency by expanding the rebuilding write domain by 121/63=192%.

Returning now to FIG. 2, at block 240: determining a target disk among the plurality of disks in the second disk set based on the plurality of scores. As an example, it is assumed that in the second disk set including the disk 120 and the disk 130, the score for the disk 120 is smaller than the score for the disk 132, then the disk 120 can be selected as the target disk. At block 250: rebuilding the data located on the failed disk on the target disk. For example, the data on the failed disk 126 is rebuilt on the selected disk 120.

By means of the data rebuilding mechanism of this solution, the rebuilding write domain can be expanded, the rebuilding time can be reduced, and the possibility of RAID data loss can be reduced. The dynamic protection mechanism based on dynamic disk boundaries can support the new rebuilding mechanism and broaden the rebuilding write domain.

Figure 7:
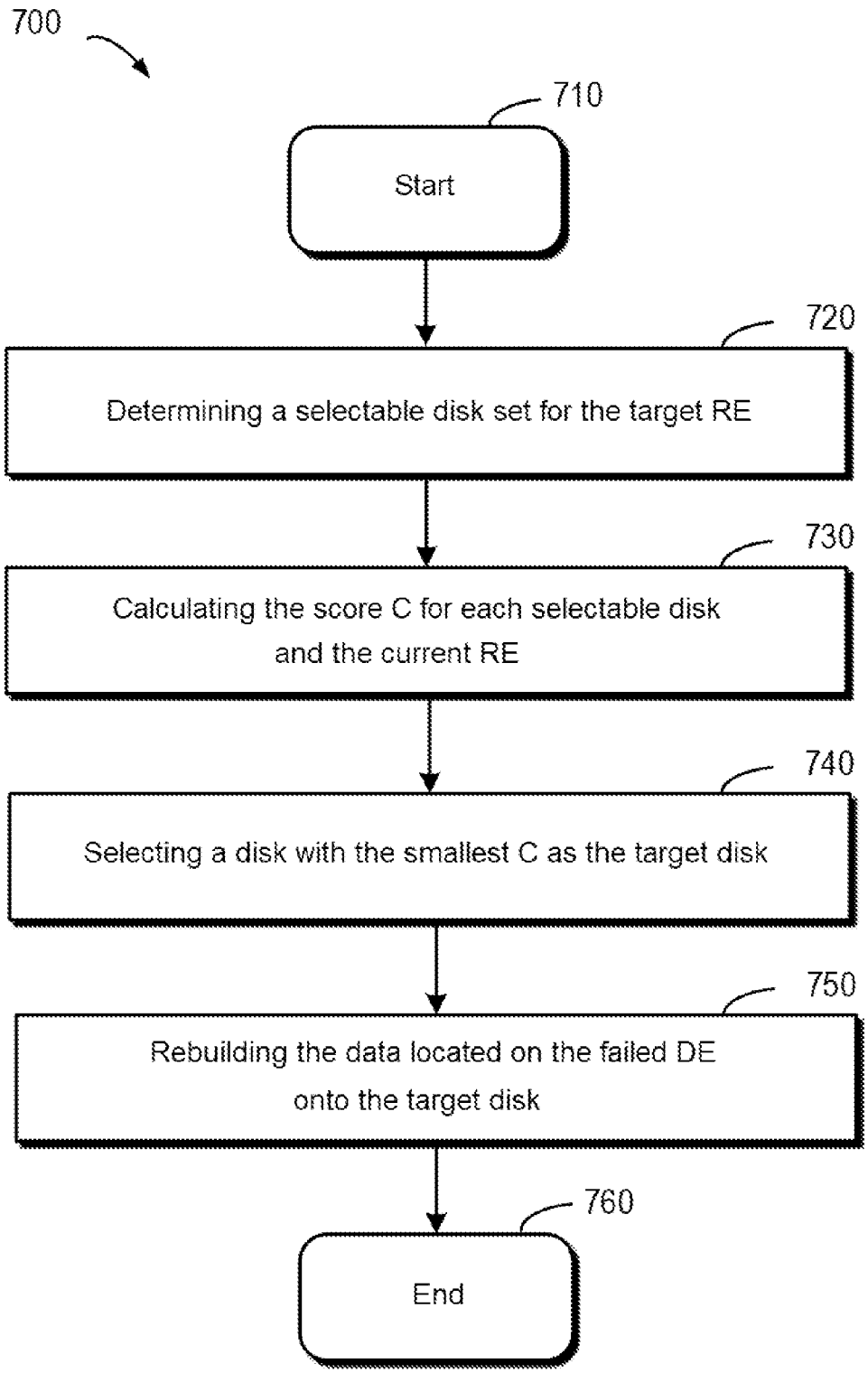
FIG. 7 is a workflow of a high-level disk rebuilding algorithm according to an illustrative embodiment of the present disclosure.

FIG. 7 is a workflow of a high-level disk rebuilding algorithm 700 according to an illustrative embodiment of the present disclosure. Based on the dynamic fencing framework provided in the present disclosure, the present disclosure further provides the following disk rebuilding algorithm. When any disk n fails, all the DEs on that disk need to be rebuilt. Because the rebuilding write domain for each RE is independent, it can be rebuilt concurrently. The rebuilding algorithm of a single RE/DE is given here, which can be referred to as the target RE/DE.

At 710: starting the algorithm. At 720: for the remaining REs related to the target DE, viewing the disk set correlated with the current RE. For example, the remaining REs are RE a and RE e. One of the REs can be selected as the current RE, for example, RE e is selected. A selectable disk set for the current RE e is determined by the following Equation (6):

$$\{\text{the selectable disk set for } RE\ e\} \quad (6)$$

-continued $$= \bigcap_{k=0}^{n-1} \{\text{the disk boundary window of Disk}_{Dk}\}$$

$-RE\ e\ \text{correlated Disks}\}$ where {the selectable disk set for RE e} denotes the selectable disk set for RE e; {the 64 disk boundary window of $\text{Disk}_{D_k}$} denotes the dynamic boundary window for $\text{Disk}_{D_k}$; and {RE e correlated Disks} denotes the disks correlated with RE e.

Figure 8:
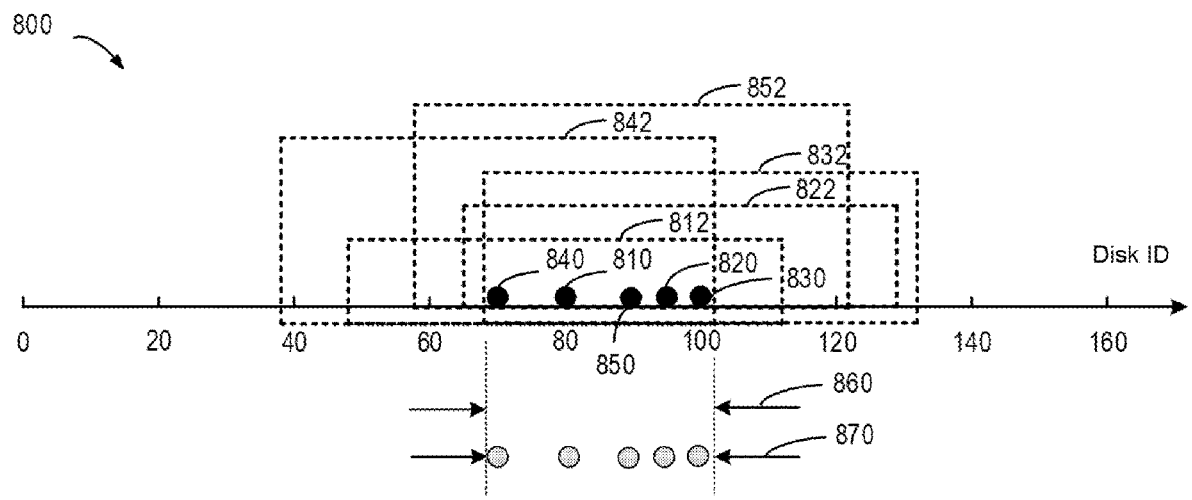
FIG. 8 is a schematic diagram of a process of determining a selectable disk set according to an illustrative embodiment of the present disclosure.

The process of determining the selectable disk set will be described below in conjunction with FIG. 8. FIG. 8 is a schematic diagram of a process 800 of determining a selectable disk set according to an illustrative embodiment of the present disclosure. As shown in FIG. 8, disks correlated with one RE include disk 810 (D80), disk 820 (D96), disk 830 (100), disk 840 (D70), and disk 850 (D90).

According to the size of the dynamic disk boundary window, the dynamic disk boundary window 812 for the disk 810 can be determined as disks D48 to D111 (32 disks are selected from the left side of the disk 810, and 31 disks are selected from the right side of the disk 810).

The dynamic disk boundary window 822 for the disk 820 is disks D64 to D127 (32 disks are selected from the left side of the disk 820, and 31 disks are selected from the right side of the disk 820). The dynamic disk boundary window 832 for the disk 830 is disks D68 to D131 (32 disks are selected from the left side of the disk 830, and 31 disks are selected from the right side of the disk 830).

The dynamic disk boundary window 842 for the disk 840 is disks D38 to D101 (32 disks are selected from the left side of the disk 840, and 31 disks are selected from the right side of the disk 840). The dynamic disk boundary window 852 for the disk 850 is disks D58 to D121 (32 disks are selected from the left side of the disk 850, and 31 disks are selected from the right side of the disk 850).

At this time, it can be assumed that the disk 810 correlated with this RE has failed, then the remaining disks are the disks 820-850. The intersection 860 of the dynamic disk boundary windows 822, 832, 842, and 852 for the disks 820-850 (also referred to as the first disk set) can be calculated. Then, disks correlated with the RE (i.e., disk 810-disk 850) are excluded from the calculated intersection, and a selectable disk set 870 (also referred to as the second disk set) can be obtained.

Now return to FIG. 7. At 730: calculating $\gamma = \gamma_{Disk\ i, current\ RE} + \gamma_{Disk\ i}$ and the score S, and then calculating the score C for each unselected disk i in the selectable disk set for the current RE e (using Equation 4), where $\gamma_{Disk\ i, current\ RE}$ can be calculated by the following Equation (7):

$$\gamma_{Disk\ i, current\ RE\ e} = \sum_{j=0}^{n-1} \gamma_{Disk\ i, Disk_{Dj}} \quad (7)$$

where $\gamma_{Disk\ i, current\ RE}$ denotes the correlation between disk i and the current RE e. Since the RE has already selected n−1 DEs at this point, here $\text{Disk}_{Dj}$ indicates the disk where Dj is located.

At 740: selecting a disk with the smallest score C as the target disk for the target failed DE. If there are a plurality of disks with the same smallest value, one disk is randomly selected as the target disk. At 750: starting rebuilding of the data located on the target failed DE onto the target disk. At 760: end of the high-level disk rebuilding algorithm 700.

In the high-level disk rebuilding algorithm 700, the dynamic disk correlation and RE span can always be evaluated when determining where to rebuild data of the failed DE, which makes it easier to balance the disk consumption of the entire mapped RAID while widening the write domain of the correlated RE as much as possible. In this way, the high-level disk rebuilding algorithm 700 can greatly improve the rebuilding efficiency.

Figure 9:
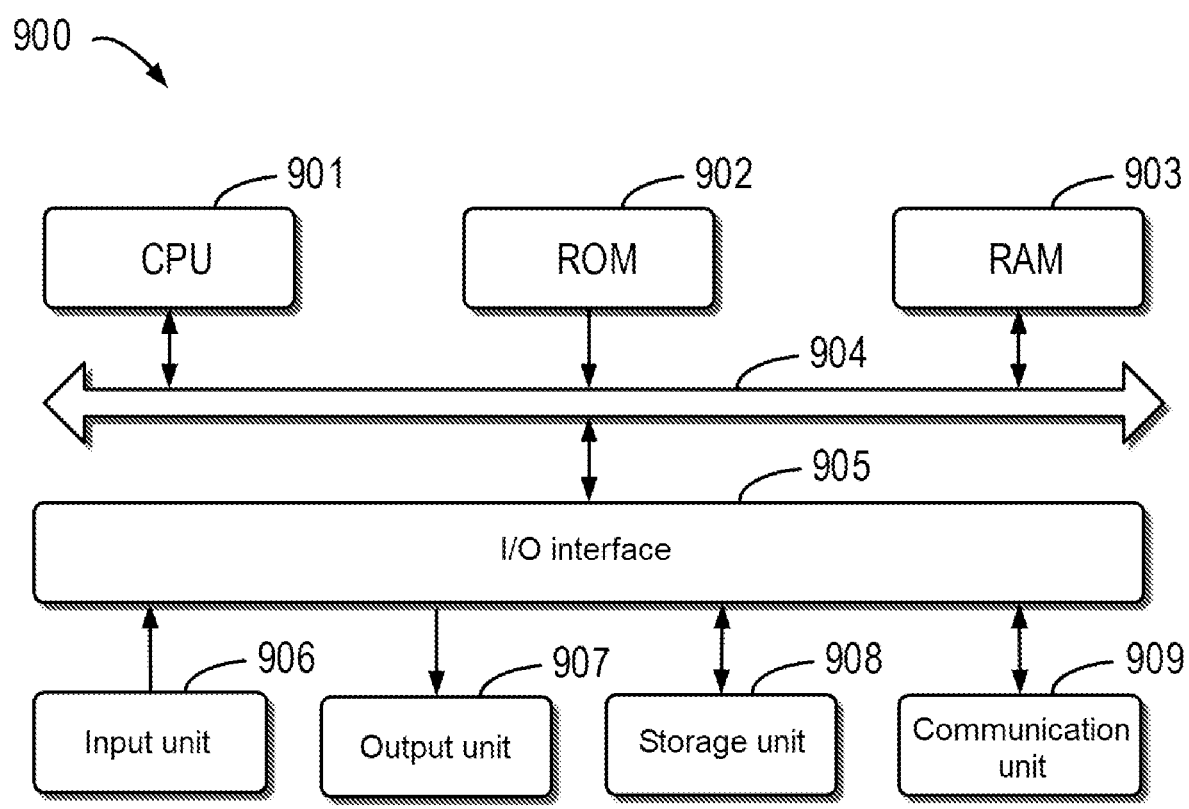
FIG. 9 is a block diagram of a device for data rebuilding according to an illustrative embodiment of the present disclosure.

FIG. 9 illustrates a schematic block diagram of a device 900 that may be used to implement embodiments of the present disclosure. The device 900 may be a device or apparatus as described in embodiments of the present disclosure. As shown in FIG. 9, the device 900 includes a central processing unit (CPU) 901 that may perform various appropriate actions and processing according to computer program instructions stored in read-only memory (ROM) 902 or computer program instructions loaded from a storage unit 908 into a random access memory (RAM) 903. In the RAM 903, various programs and data required for the operation of the device 900 may also be stored. The CPU 901, the ROM 902, and the RAM 903 are connected to each other through a bus 904. An input/output (I/O) interface 905 is also connected to the bus 904. Although not shown in FIG. 9, the device 900 may also include a co-processor.

A plurality of components in the device 900 are connected to the I/O interface 905, including: an input unit 906, such as a keyboard and a mouse; an output unit 907, such as various types of displays and speakers; a storage unit 908, such as a magnetic disk and an optical disc; and a communication unit 909, such as a network card, a modem, and a wireless communication transceiver. The communication unit 909 allows the device 900 to exchange information/data with other devices via a computer network, such as the Internet, and/or various telecommunication networks.

The various methods or processes described above may be performed by the CPU 901. For example, in some embodiments, one or more of the methods or processes may be implemented as a computer software program that is tangibly included in a machine-readable medium, such as the storage unit 908. In some embodiments, part or all of the computer programs may be loaded and/or installed onto the device 900 via the ROM 902 and/or the communication unit 909. When the computer program is loaded into the RAM 903 and executed by the CPU 901, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two successive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a special-purpose hardware-based system that executes specified functions or actions, or using a combination of special-purpose hardware and computer instructions.

Various embodiments of the present disclosure have been described above. The foregoing description is illustrative rather than exhaustive, and is not limited to the embodiments disclosed. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the various embodiments disclosed herein.

What is claimed is:

1. A data rebuilding method, comprising:
    determining, in response to a failure of a disk where a redundant array of independent disks (RAID) extent of a RAID in a storage system is located, a first disk set based on a predetermined range and the failed disk, wherein the first disk set comprises a plurality of disks within the predetermined range that are associated with the RAID extent, and wherein at least a first disk of the RAID extent has a first multiple-disk boundary window associated therewith and a second disk of the RAID extent has a second multiple-disk boundary window associated therewith, the second multiple-disk boundary window being different than the first multiple-disk boundary window, the first disk set being determined based on an intersection between at least the first multiple-disk boundary window and the second multiple-disk boundary window;

determining a second disk set for rebuilding data located
   on the failed disk based on other disks in the first disk
   set than the plurality of disks that are associated with
   the RAID extent;
determining a plurality of scores for a plurality of disks in
   the second disk set based on a plurality of disk corre-
   lations, a plurality of RAID extent spans, and a plural-
   ity of weights of the plurality of disks in the second disk
   set;
determining a target disk among the plurality of disks in
   the second disk set based on the plurality of scores; and
rebuilding the data located on the failed disk on the target
   disk.

2. The method according to claim 1, wherein the storage system comprises a plurality of disks, the plurality of disks in the storage system are arranged in a circular manner, and the number of the plurality of disks in the storage system is greater than the number of a plurality of disks for forming the RAID.

3. The method according to claim 2, wherein determining a first disk set based on a predetermined range and the failed disk comprises:
   determining a size of a predetermined window, the size of
      the predetermined window indicating the number of
      disks within the predetermined range;
   determining respectively a plurality of disks in the pre-
      determined window that correspond to disks of the
      plurality of disks associated with the RAID extent; and
   determining an intersection of the plurality of disks cor-
      responding respectively to the disks of the plurality of
      disks as the first disk set.

4. The method according to claim 3, wherein determining respectively a plurality of disks in the predetermined window that correspond to disks of the plurality of disks associated with the RAID extent comprises:
   determining, for a first disk of the plurality of disks
      associated with the RAID extent, two disks at the
      rightmost end and the leftmost end in a clockwise
      direction within the predetermined window among the
      plurality of disks in the storage system;
   determining a plurality of disks between the two disks as
      the plurality of disks within the predetermined window
      for the first disk;
   determining, for a second disk of the plurality of disks
      associated with the RAID extent, two disks at the
      rightmost end and the leftmost end in a clockwise
      direction within the predetermined window among the
      plurality of disks in the storage system, wherein the
      second disk is different from the first disk; and
   determining a plurality of disks between the two disks as
      the plurality of disks within the predetermined window
      for the second disk.

5. The method according to claim 1, wherein a disk correlation indicates distribution of a plurality of RAID extents that have been created in the storage system between a disk and other disks than the disk.

6. The method according to claim 2, wherein a RAID extent span is determined based on:
   determining two disk serial numbers of two disks at the
      rightmost end and the leftmost end in a clockwise
      direction among the plurality of disks in the second
      disk set and among the plurality of disks where the
      RAID extent is located; and
   determining the RAID extent span based on a difference
      between the two disk serial numbers.

7. The method according to claim 1, wherein the plurality of weights comprise a first weight and a second weight, and determining a plurality of scores for a plurality of disks in the second disk set based on a plurality of disk correlations, a plurality of RAID extent spans, and a plurality of weights of the plurality of disks in the second disk set comprises:
   determining, for a first disk of the plurality of disks
      associated with the RAID extent, a first disk correlation
      and a first RAID extent span corresponding to the first
      disk;
   determining a first product based on the first weight and
      the first disk correlation;
   determining a second product based on the first weight
      and a reciprocal of the first RAID extent span; and
   determining a sum of the first product and the second
      product as a first score for the first disk.

8. The method according to claim 1, wherein determining a target disk among the plurality of disks in the second disk set based on the plurality of scores comprises:
   selecting a disk with the smallest score among the plu-
      rality of scores from the second disk set as the target
      disk; or
   selecting, in response to scores for at least two disks being
      equally the smallest, one of the at least two disks at
      random as the target disk.

9. The method according to claim 1, wherein the failed disk is a first failed disk, the target disk is a first target disk, and the RAID extent further comprises a second failed disk, the method further comprising:
   determining, for the second failed disk, a second target
      disk corresponding to the second failed disk in parallel
      with determining the first target disk corresponding to
      the first failed disk; and
   rebuilding data located on the second failed disk on the
      second target disk in parallel with rebuilding the data
      located on the first failed disk on the first target disk.

10. An electronic device, comprising:
   at least one processor; and
   memory coupled to the at least one processor, wherein the
      memory has instructions stored therein, and the instruc-
      tions, when executed by the at least one processor,
      cause the electronic device to perform actions compris-
      ing:
   determining, in response to a failure of a disk where a
      redundant array of independent disks (RAID) extent of
      a RAID in a storage system is located, a first disk set
      based on a predetermined range and the failed disk,
      wherein the first disk set comprises a plurality of disks
      within the predetermined range that are associated with
      the RAID extent, and wherein at least a first disk of the
      RAID extent has a first multiple-disk boundary window
      associated therewith and a second disk of the RAID
      extent has a second multiple-disk boundary window
      associated therewith, the second multiple-disk bound-
      ary window being different than the first multiple-disk
      boundary window, the first disk set being determined
      based on an intersection between at least the first
      multiple-disk boundary window and the second mul-
      tiple-disk boundary window;
   determining a second disk set for rebuilding data located
      on the failed disk based on other disks in the first disk
      set than the plurality of disks that are associated with
      the RAID extent;
   determining a plurality of scores for a plurality of disks in
      the second disk set based on a plurality of disk corre-
      lations, a plurality of RAID extent spans, and a plural-
      ity of weights of the plurality of disks in the second disk
      set;

determining a target disk among the plurality of disks in the second disk set based on the plurality of scores; and
rebuilding the data located on the failed disk on the target disk.

11. The electronic device according to claim 10, wherein the storage system comprises a plurality of disks, the plurality of disks in the storage system are arranged in a circular manner, and the number of the plurality of disks in the storage system is greater than the number of a plurality of disks for forming the RAID.

12. The electronic device according to claim 11, wherein determining a first disk set based on a predetermined range and the failed disk comprises:
determining a size of a predetermined window, the size of the predetermined window indicating the number of disks within the predetermined range;
determining respectively a plurality of disks in the predetermined window that correspond to disks of the plurality of disks associated with the RAID extent; and
determining an intersection of the plurality of disks corresponding respectively to the disks of the plurality of disks as the first disk set.

13. The electronic device according to claim 12, wherein determining respectively a plurality of disks in the predetermined window that correspond to disks of the plurality of disks associated with the RAID extent comprises:
determining, for a first disk of the plurality of disks associated with the RAID extent, two disks at the rightmost end and the leftmost end in a clockwise direction within the predetermined window among the plurality of disks in the storage system;
determining a plurality of disks between the two disks as the plurality of disks within the predetermined window for the first disk;
determining, for a second disk of the plurality of disks associated with the RAID extent, two disks at the rightmost end and the leftmost end in a clockwise direction within the predetermined window among the plurality of disks in the storage system, wherein the second disk is different from the first disk; and
determining a plurality of disks between the two disks as the plurality of disks within the predetermined window for the second disk.

14. The electronic device according to claim 10, wherein a disk correlation indicates distribution of a plurality of RAID extents that have been created in the storage system between a disk and other disks than the disk.

15. The electronic device according to claim 11, wherein a RAID extent span is determined based on:
determining two disk serial numbers of two disks at the rightmost end and the leftmost end in a clockwise direction among the plurality of disks in the second disk set and among the plurality of disks where the RAID extent is located; and
determining the RAID extent span based on a difference between the two disk serial numbers.

16. The electronic device according to claim 10, wherein the plurality of weights comprise a first weight and a second weight, and determining a plurality of scores for a plurality of disks in the second disk set based on a plurality of disk correlations, a plurality of RAID extent spans, and a plurality of weights of the plurality of disks in the second disk set comprises:
determining, for a first disk of the plurality of disks associated with the RAID extent, a first disk correlation and a first RAID extent span corresponding to the first disk;
determining a first product based on the first weight and the first disk correlation;
determining a second product based on the first weight and a reciprocal of the first RAID extent span; and
determining a sum of the first product and the second product as a first score for the first disk.

17. The electronic device according to claim 10, wherein determining a target disk among the plurality of disks in the second disk set based on the plurality of scores comprises:
selecting a disk with the smallest score among the plurality of scores from the second disk set as the target disk; or
selecting, in response to scores for at least two disks being equally the smallest, one of the at least two disks at random as the target disk.

18. The electronic device according to claim 10, wherein the failed disk is a first failed disk, the target disk is a first target disk, and the RAID extent further comprises a second failed disk, the actions further comprising:
determining, for the second failed disk, a second target disk corresponding to the second failed disk in parallel with determining the first target disk corresponding to the first failed disk; and
rebuilding data located on the second failed disk on the second target disk in parallel with rebuilding the data located on the first failed disk on the first target disk.

19. A computer program product comprising a non-transitory computer readable medium and computer-executable instructions stored therein, wherein the computer-executable instructions, when executed by a device, cause the device to perform actions comprising: determining, in response to a failure of a disk where a redundant array of independent disks (RAID) extent of a RAID in a storage system is located, a first disk set based on a predetermined range and the failed disk, wherein the first disk set comprises a plurality of disks within the predetermined range that are associated with the RAID extent, and wherein at least a first disk of the RAID extent has a first multiple-disk boundary window associated therewith and a second disk of the RAID extent has a second multiple-disk boundary window associated therewith, the second multiple-disk boundary window being different than the first multiple-disk boundary window, the first disk set being determined based on an intersection between at least the first multiple-disk boundary window and the second multiple-disk boundary window; determining a second disk set for rebuilding data located on the failed disk based on other disks in the first disk set than the plurality of disks that are associated with the RAID extent; determining a plurality of scores for a plurality of disks in the second disk set based on a plurality of disk correlations, a plurality of RAID extent spans, and a plurality of weights of the plurality of disks in the second disk set; determining a target disk among the plurality of disks in the second disk set based on the plurality of scores; and rebuilding the data located on the failed disk on the target disk.

20. The computer program product according to claim 19, wherein the storage system comprises a plurality of disks, the plurality of disks in the storage system are arranged in a circular manner, and the number of the plurality of disks in the storage system is greater than the number of a plurality of disks for forming the RAID.

* * * * *